Nov. 27, 1956  A. BEUSCH  2,771,821

ANGULAR WORK TABLE

Filed Jan. 23, 1953

Inventor
ANDREW BEUSCH

By Charles L. Lovercheck
Attorney

United States Patent Office 2,771,821
Patented Nov. 27, 1956

2,771,821

ANGULAR WORK TABLE

Andrew Beusch, Erie, Pa.

Application January 23, 1953, Serial No. 332,907

8 Claims. (Cl. 90—59)

This invention relates to work tables and more particularly to work tables and angle plates for use in connection with machine tools wherein the work surface can be set at an angle and this angle can be adjusted very accurately.

In work tables and tool maker's angle plates made according to present designs, the tables are provided with a base and a work surface pivoted to the base at one end and the angular adjustment of the plate is obtained by a graduated dial on the hub of the base between the part which supports the surface and the table base. During machining operations, the gauge blocks sometimes tend to move as a result of vibration of the machine on which the table is being used and errors in machining result which cause damaged or completely unusable work.

It is, accordingly, an object of my invention to provide a work table for use on machine tools for machining angular surfaces, holes, and joints which is simple in construction and will be economical in manufacture.

Another object of the invention is to provide a work table wherein angles can be set with extreme accuracy and with little difficulty.

Another object of my invention is to provide a work table which will be rigid when set up and will not be thrown out of adjustment by vibration of the machinery whereon the work table is supported.

A further object of my invention is to provide a work table which can be set to any desired angle and positively locked in a position.

A further object of my invention is to provide a work table in combination with a novel type locking device for an angle setting means.

A still further object of my invention is to provide a novel type of adjusting and locking screw for work tables.

Another object of my invention is to provide a work table which can be used in a horizontal or vertical position.

With the above and other objects in view, the present invention consists of the combination and arrangement of parts hereinafter more fully described, illustrated in the accompanying drawing, and more particularly pointed out in the appended claims, it being understood that changes may be made in the form, size, proportion, and minor details of construction without departing from the spirit or sacrificing any of the advantages of the invention.

Figure 1:
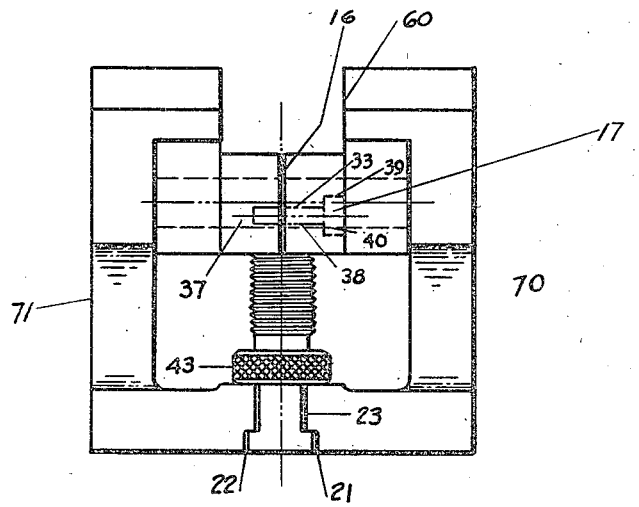
Fig. 1 is an end view of my work table according to my invention.
Figure 2:
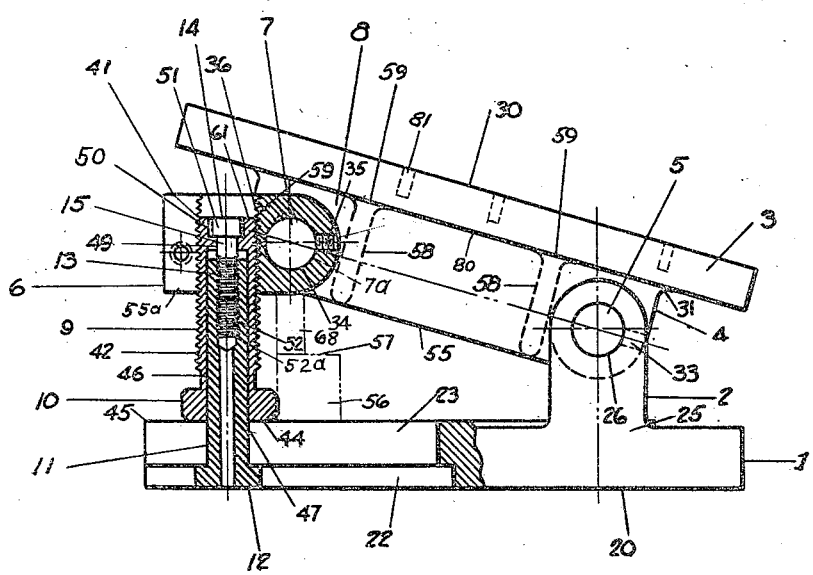
Fig. 2 is a side view partly in section showing some of the novel features of my invention.

Now with more specific reference to the drawing, the base 1 has the bottom surface 20 finished accurately to engage the work table of a machine tool such as a milling machine or drill press. A T-slot 21 is machined through one end of the base 1. The T-slot has an enlarged portion 22 and a reduced portion 23 for receiving the head 12 of a stud 11 and the body portion of the stud, respectively.

Two bearing blocks 2 are integrally attached to the base 1 at 25 and they have holes 26 accurately bored therein to receive pin 5. The pin 5 is very accurately fitted to the holes 26 but are slidable or pivotal therein. The table top 3 has an accurately machined work receiving surface 30 and two spaced web extensions 4 are integrally attached to the table top 3 at 31. Holes are bored in the extensions 4 to receive the pin 5 and pin 5 is locked to extensions 4 by means of a set screw 33 or other suitable means. Additional holes 7a are bored in the extensions 4 for receiving pin 7. The holes 7a for receiving the pin 7 are accurately bored to slidably or pivotally engage the pin 7.

Swinging block 6 has a hole 34 bored therein to receive pin 7 and pin 7 is locked in block 6 by means of set screws 35. A threaded hole 36 is formed in the swinging block 6 and a slot 16 is provided in swinging block 6 perpendicular to hole 36. Slot 16 extends into block 6 and merges with the threaded hole 36. A hole 37 has threads 38 to cooperate with threaded clamp screw 17 and the hole 37 is countersunk at 39 to accommodate head 40 of clamp screw 17.

The hole 36 has internal threads 41 for mating with external threads 42 on the adjusting screw 9. When the adjusting screw 9 is rotated to move block 6 to the desired height, the clamp screw 17 can be tightened to take up any slack or backlash between the screw threads on screw 9 and the block 6. This adjustment of screw 9 by clamp screw 17 also prevents vibration of the machine tool from upsetting the adjustment of screw 9. The adjusting screw 9 has a knurled portion 43 which adds additional convenience in adjusting the screw. The bottom surface 44 of the screw 9 is accurately machined to engage the top surface 45 of the base 1. The adjusting screw 9 is bored at 46 to engage the body portion 47 of the stud 11.

The adjusting screw 9 has a reduced size bore 49 and counterbore 50 for cooperating with the head 51 of cap screw 14. The reduced bore 49 is hexagonal in shape to accommodate a wrench when it is desired to use a wrench to spin the screw to make a rapid adjustment of the screw 9 in the block 6. A body 15 of the cap screw 14 extends through the hexagonal hole 49 and threads 52 are provided on cap screw 14. Stud 11 has internal threads 52a which cooperate with the external threads 52 on cap 14.

The bottom surface 55a of the swinging block 6 is accurately machined to rest on gauge block 56 which can be placed to rest on top of machine surface 45 of base 1. The height or thickness of gauge block 56 is of such dimension that when the table top 3 is lowered until the surface 55a engages the top surface 57 of gauge block 56, the surface 30 of the work table will be parallel to the bottom surface 20 of the base 1.

If it is desired to check the angularity of top surface 30 of table top 3 with respect to the bottom surface 20 of base 1 by reference to a table of sines of angles or by calculation, the required thickness of gauge block 68 can be determined since the distance between the centers of pins 5 and 7 can be measured accurately and is preferably five inches, ten inches, or some multiple of ten. The required thickness of gauge block 68 can be inserted on top of block 56 and the screw 9 rotated to bring swinging block 6 down into engagement with block 68. The gauge block 68 can then be moved slightly by hand in order to make certain that it is in slightly swinging relation between the block 56 and swinging block 6 so that that dimension is exactly equivalent to the dimension desired. The thickness of gauge block 68 will be equal to the distance between the centers of pins 5 and 7 multiplied by the sine of the angle at which it is desired to set the surface 30 with respect to surface 20. The device can then be locked by tightening screw 14 to hold the table top locked in this relation.

The transverse webs 58 are integral with the table top 3 at 59 and attached to the webs 4 at either end thereof to lend additional rigidity to the table top.

In the operation of the work table, the cap screw 14 is removed from the stud 11 and the adjusting screw 9 is rotated by grasping the knurled surface 43 or by inserting a suitable wrench in extensions 4. This rotation is continued until the block 6 moves downward on the threads until the surface 55a of the swinging block 6 engages the top surface 57 of the gauge block. In this position, the top surface 30 of the table top 3 will be exactly parallel with the bottom surface 20 of the base 1. The top edge 61 of the cap screw will be below the top surace 30 of the table top 3 and, therefore, will not interfere with any work clamped to the surface 30. When it is desired to use the work table in this position, the cap screw 14 can be tightened in the stud 11 to lock the table in this position.

In order to set any desired angle, the clamp screw 17 and cap screw 14 can be loosened and the adjusting screw 9 rotated to move the swinging block 6 upward or downward and when the surface 30 reaches the desired angle with regard to the surface 20 as indicated by the size of the gauge block 68, the cap screw 14 can be locked in the stud 11 to hold the table top 3 rigidly in the desired position.

Since all the contacting surfaces between the relatively moving parts of the work table are accurately machined and fit snugly, the table top will be held rigid with regard to the base 1 throughout any machining operation during which the work table is used.

Threaded holes 81 are provided in top surface 50 for clamping on work and the under surface 80 of the table is machined to accommodate clamps.

Since there are no parts of my novel work table protruding past the edges thereof, the table can be clamped to a vertical plate with its sides resting on a horizontal table or clamped to tables in almost unlimited number of positions and environments. The edges 70 may be machined parallel to edges 71 so that the work table can be used by clamping to a machine table with either surface 70 or 71 engaging the machine table.

This work table can be used to hold work in position to machine compound angles by disposing two of the herein described tables, one on top of the other with the angle of the tops of the tables set to give the desired angle.

In the foregoing specification, I have set forth the invention in its preferred practical forms but I am aware that the structure shown is capable of modification within a range of equivalents without departing from the invention which is to be understood is broadly novel as is commensurate with the appended claims.

What I claim is:

1. A work table comprising a base, a table top swingably connected to said base, means to adjust the angularity of said table top with regard to said base, said means comprising a block swingably connected to said table top at a point spaced from said pivot point of said table top with said base, a screw threadably engaging said swinging block at one end therof and engaging said base at the other end thereof, said screw being hollow, and a stud extending through said base and into said hollow of said screw locking said table top to said base.

2. A work table comprising a base, a table top swingably connected to said base, means to adjust the angularity of said table top with regard to said base, said means comprising a block swingably connected to said table top at a point spaced from said pivot point of said table top with said base, a screw threadably engaging said swinging block at one end thereof and engaging said base at the other end thereof, said screw being hollow, a slot in said base, a stud having a head extending through said slot and into said hollow screw, and a cap screw engaging said screw to lock said screw to said stud.

3. A work table comprising a base having upwardly extending bearing blocks attached thereto, a table top, longitudinal webs attached to said table top, bored holes in said bearing blocks aligned with holes in said webs, a pin fitted into said aligned holes to pivotally connect said table top to said bearing blocks, a swinging block swingably attached to said web and spaced from said bearing blocks, said swinging block having a threaded hole therein disposed generally perpendicular to said pin, a screw threadably engaging said threaded hole, one end of said screw resting on said base, means to lock said swinging block to said screw, and means to lock said screw to said base.

4. A work table comprising a base, a table top swingably connected to said base, means to adjust the angularity of said table top with regard to said base, said means comprising a block pivotally connected to said table top at a point spaced from said pivot point of said table top with said base, and a screw threadably engaging a threaded hole in said block at one end thereof, said hole being disposed in said block perpendicular to the path through which said table may swing, said screw engaging said threaded hole and extending from said hole in said block and engaging said base at the other end thereof, the edges of the base having the edges thereof machined parallel to each other whereby the table can be disposed on edge on a machine table.

5. A work table comprising a base, a table top swingably connected to said base, a swinging block pivotally connected to said table top, said block having a machined surface on the side thereof adjacent said base and said base having a complementary part thereof machined, said machined surfaces being adapted to have gauge blocks disposed therebetween, means to urge said swinging block surface and said base surface into engagement with said gauge blocks and locked in this position, said base having a T-slot therein and said means to clamp said table top to said base comprising a screw engaging said swinging block and having a machined end surface engaging the top surface of said base, and a stud extending through said slot to lockingly engage said screw whereby said table top is rigidly locked to said base.

6. A work table comprising a base, a table top swingably connected about a transverse axis to said base, a block swingably connected to said table about a transverse axis remote from said swingable connection to said table top, a threaded bore in said block perpendicular to said block transverse axis, and a threaded screw threadably engaging said threaded bore, the distal end of said screw being adapted to engage said base whereby the downwardly swinging movement of said table is limited.

7. The work table recited in claim 6 wherein said screw has means on the lower end thereof locking said screw to said table and said table against swinging.

8. A work table comprising a base having two parallel upwardly extending ears on the top surface thereof, a table having a flange extending downwardly from the table top, a bore through said flange and a bore in alignment therewith in said ears, a pin extending through said bores whereby said table is swingably connected to said base, a second bore in said flange spaced from said first bore, a block having a bore therein, a pin extending through said bore in said block and said bore in said flange swingably connecting said block to said flange, a threaded second bore in said block perpendicularly disposed to said first bore, a screw in said second bore and extending downwardly therefrom, a slot in said base, a bore through said screw registering with said slot in said base, a stud extending through said slot and into a concentric axially disposed bore in said screw, said stud having a head engaging the surface of said base below said slot, and means to lock said stud to said screw whereby said table is locked relative to said base.

References Cited in the file of this patent

UNITED STATES PATENTS

| | | |
|---|---|---|
| 1,521,341 | Thacher | Dec. 20, 1924 |
| 1,551,995 | Lovenston | Sept. 1, 1925 |
| 2,351,773 | Lovenston | June 20, 1944 |

FOREIGN PATENTS

| | | |
|---|---|---|
| 238,189 | Switzerland | Oct. 1, 1945 |
| 569,613 | Great Britain | May 31, 1945 |
| 592,327 | Great Britain | Sept. 15, 1947 |